L. F. FISCHER & G. W. BURTON.
PASSENGER CAR CONSTRUCTION.
APPLICATION FILED JULY 15, 1912.
1,182,546. Patented May 9, 1916.
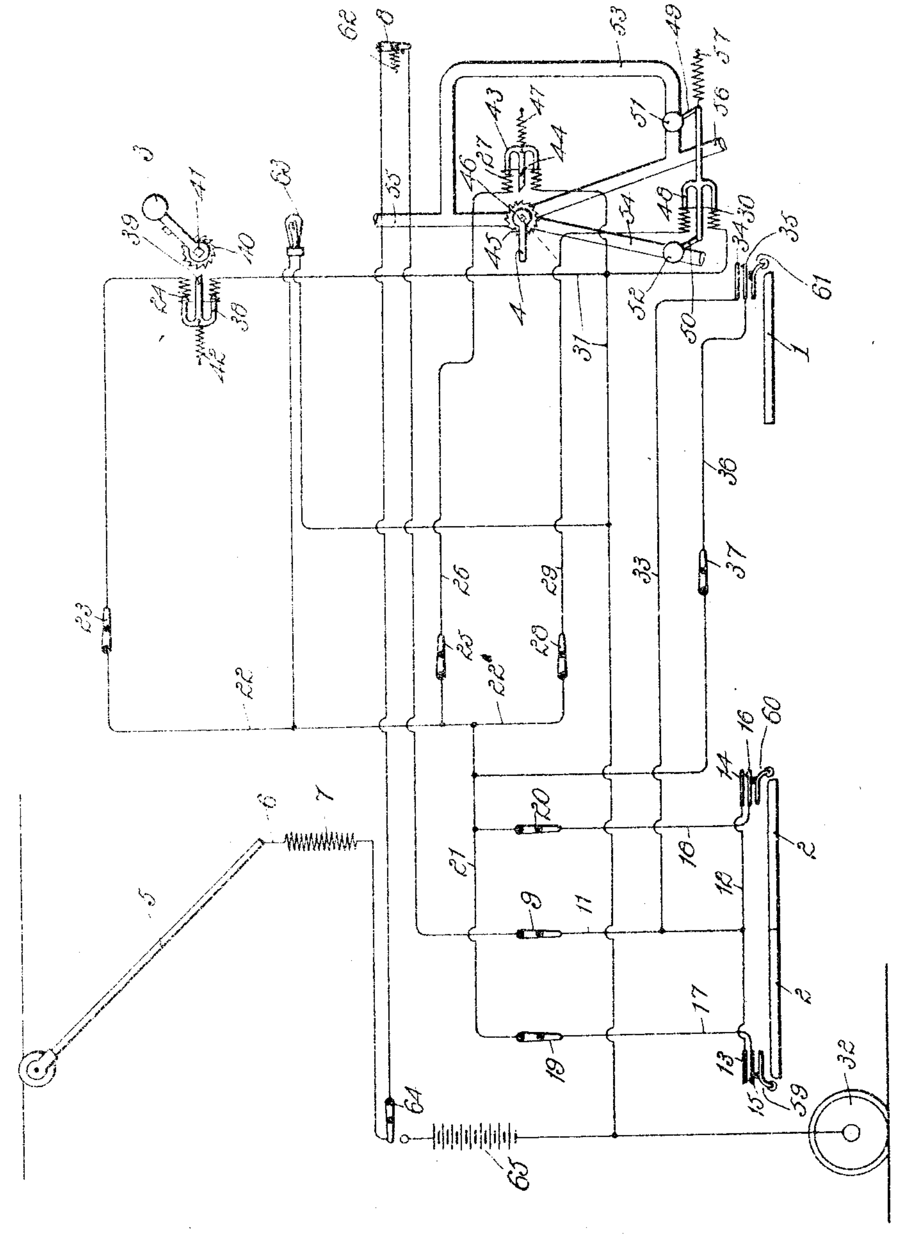
Witnesses:
Robert F. Bracke
Leslie W. Fricke
Inventors
Louis F. Fischer
George W. Burton
By George W. Burton
Attorney

UNITED STATES PATENT OFFICE.

LOUIS E. FISCHER, OF ST. LOUIS, MISSOURI, AND GEORGE W. BURTON, OF PEORIA, ILLINOIS.

PASSENGER-CAR CONSTRUCTION.

1,182,546. Specification of Letters Patent. Patented May 9, 1916.

Original application filed October 21, 1911, Serial No. 656,000. Divided and this appliation filed July 15, 1912. Serial No. 709,364.

*To all whom it may concern:*

Be it known that we, LOUIS E. FISCHER and GEORGE W. BURTON, citizens of the United States, residing at St. Louis, in the State of Missouri, and at Peoria, in the county of Peoria and State of Illinois, respectively, have invented certain new and useful Improvements in Passenger-Car Constructions, of which the following is a full, clear, concise, and exact description, reference being had to the accompanying drawing, forming a part of this specification.

Our invention relates generally to passenger cars, and especially to improvements therein, intended to secure greater safety to passengers, this application being a divisional application covering the subject matter embraced in our application, Serial No. 656,000 for passenger car constructions, filed October 21, 1911.

Our invention contemplates safety devices for coöperating with the doors of the car so as to render the car partially or wholly inoperative as desired, when either the ingress or the egress door or both are open.

The safety devices may comprise locking mechanism associated with the operator's or brake controlling valve, the electric controller or an additional valve or valves in the air brake system by which the control of the car is taken from the operator temporarily or the brake is positively set or both as desired. Means are also provided for temporarily interrupting the operation of the safety system for emergency operation of the car, without, however, interfering in any way with the measure of safety provided by the normal operation of these devices. In this way danger from alighting from or entering the car is reduced to a minimum since during the normal operation of the safety devices, motion of the car is restrained or prevented while passengers are leaving or entering the ingress or egress doors.

Our invention also additionally safeguards operation by provision of automatic starting signals.

Our invention will be more readily understood by reference to the accompanying drawing, which is a diagrammatic view illustrating the arrangement of the safety controlling devices embodying our invention.

Preferably in the same side of the car, as indicated in the drawing, are disposed near the forward end the ingress door 1 and near the center of the car the egress doors 2. Both ingress and egress doors are of the sliding type. The egress doors are so connected that any motion imparted to one of the doors is necessarily communicated in an opposite direction to the other. The operator's equipment includes the usual electric controller 3 and air brake controlling valve 4.

In the protective system shown electric currents are arranged in connection with the ingress and egress doors and operator's controlling devices as follows: From the trolley pole 5 connection is made by wire 6 with a protecting resistance 7 through switches 8 and 9 with the wire 11, which in turn is connected by the wire 12 with contact springs 13 and 14. The springs 13 and 14 are normally separated from but adapted to be engaged by springs 15 and 16 connected by wires 17 and 18 through switches 19 and 20 respectively with wire 21 by which connection is made with wire 22 connected through switch 23 with one terminal of the solenoid 24. The wire 22 is also connected through switch 25 by wire 26 with one terminal of the solenoid 27 and through switch 28 by wire 29 with one terminal of the solenoid 30. The other terminals of the solenoids 24, 27 and 30 are connected together and by wire 31 connection is made with one of the wheels 32 of the car. The wire 11 is also connected by wire 33 with contact spring 34 normally separated from but adapted to be engaged by contact spring 35 connected by wire 36 through the switch 37 with wire 21.

From the above circuit arrangement it will appear that with all of the switches in their closed position upon the closure of either the contact springs 13 and 15 or 14 and 16 or 34 and 35, a circuit is completed from the trolley pole 5 to the wheel 32 through the three solenoids 24, 27 and 30 in parallel and further that by means of the switches 23, 25 and 28 any one or more of the solenoids 24, 27 and 30 may be cut out of circuit and rendered inoperative as desired; and, further, that by means of the switches 19, 20 and 37 either the contact springs 13 and 15 or 14 and 16 or 34 and 35, respectively, may be cut out of circuit and rendered inoperative, as desired.

The arrangement of the switch springs and circuit connections shown in connection with the egress doors is such as preferably would be employed in connection with a construction in which these doors are operated independently of each other. Where the egress doors however are arranged to operate in conjunction with each other so that the opening or closing of one door entails the concurrent opening or closing of the other, then if desired, one pair of contact springs and the corresponding connections may be omitted.

Either the switch 8 or 9 moved to its open position serves to render the entire protective system inoperative.

The solenoid 24 is provided with a plunger 38 adapted when the solenoid is energized to move the pawl 39 into engagement with the ratchet wheel 40 mounted upon the shaft 41 of the electric controller 3. The relation between the pawl 39 and ratchet wheel 40 is such that from any position of the controller handle when the pawl is in engagement with the ratchet wheel, the handle may be moved to its "off" position but not in a reverse direction. A spring 42 serves to move the pawl 39 out of engagement with the ratchet wheel 40 when the solenoid is deënergized.

The solenoid 27 is provided with a plunger 43, adapted when the solenoid is energized to move the pawl 44 into engagement with the ratchet wheel 45 carried by the shaft 46 of the operator's brake controller. The conformation of the pawl 44 and ratchet wheel 45 is such that when they are in engagement the air controller 4 may be moved from its released to its set position but not in a reverse direction. A spring 47 withdraws the pawl 44 from engagement with the ratchet wheel 45 when the solenoid is deënergized.

The solenoid 30 is provided with a plunger 48 connected with the operating levers 49 and 50 of the valves 51 and 52 located in the pipes 53 and 54, respectively. The pipe 54 is a pipe leading from the operator's air brake controller to the atmosphere while the pipe 55 is a pipe leading from the pressure reservoir to the air brake controller. The pipe 53 is a by-pass passing from the pipe 55 around the air brake controller to the pipe 56 which constitutes the connection between the air brake controller and the controlling cylinder of the air brake mechanism. The arrangement of the valves 51 and 52 is such that when the solenoid 30 is deënergized, the spring 57 by moving the plunger 48 to its right hand position opens the valve 52 and closes the valve 51 thus permitting the proper operation of the brakes by the air brake controller 4. When however the solenoid 30 is energized, the motion of the plunger 48 to the left closes the valve 52 and opens the valve 51 thus preventing release of the brakes and positively setting them, if they are not set, regardless of the position of the handle of the air brake controller. It is apparent that by disconnecting the plunger 48 from either of the levers 49 or 50 the solenoid 30 may be made to control either the valve 51 or 52 or both of such valves as desired.

From the above description it will appear that the solenoid 24 provides a means for locking the electric controller against operation when current is caused to flow through the circuit described by the closure of any pair of the controlling contracts above referred to; that the solenoid 27 affords a means for directly locking the air brake controller, preventing moving it from its set to its released position, and that the solenoid 30 provides a means for either preventing release of the brakes by means of the air brake controller or for setting the brakes independently of the air brake controller or both regardless of the position of the air brake controller handle.

It will be apparent to those skilled in the art that while the air brake which is shown in the figure is of the type known as the "straight air" system, that the protective devices may be arranged with equal facility in connection with the apparatus used in what is called the automatic air system by re-arranging the connections of the controlling devices to meet the conditions found in the automatic system.

The contact spring 15 has disposed beneath it, as indicated, a lever 59 provided with a roller at its left hand end and pivotally supported at its right hand end. The lever 59 is normally held in the position indicated by a suitable spring and said lever carries a block of insulating material adapted to engage the contact spring 15 when the lever is moved forward on its pivot. The roller carried by the left hand end of the lever 59 is adapted to be engaged by the left hand edge of the left hand egress door 2 when the latter is moved even a small amount from its normally closed position and the motion thus imparted to the lever 59 is sufficient to move the contact spring 15 into engagement with the contact spring 13 thus closing the circuit as traced above through such of the solenoids 24, 27 and 30

[illegible] as shown in the [illegible]

Lever 60 similar to the lever [illegible] is pivoted adjacent to the right hand [illegible] the right hand egress door [illegible] thereby when the same is opened [illegible] move the contact spring 13 into engagement with the contact spring 14 in a manner similar to that described in connection with the springs 15 and 16.

Lever 61 similar to the lever 20 is disposed adjacent to the right hand edge of the ingress door 4 and is adapted, when operated by the motion of the door to the right to move the contact spring 35 into engagement with the contact spring 34 in a manner similar to that described in connection with the contact springs 15 and 16 above.

It will be noted that when the circuit controlling systems are closed no one of the ingress or egress doors can be opened sufficiently to permit a person to enter or leave the car without closing the contacts associated with the door thus opened, and further that the contacts thus closed remain closed as long as the door is in its open position.

The switch 8, located in the wire 11, may be disposed in a position convenient for operation by the operator of the car in case of emergency so that the protective system may be temporarily disabled. A spring 62 normally holds the switch 8 in closed position and if for any reason it is necessary to operate the car when one of the egress or ingress doors is in open position the operator may do so by holding the switch 8 in its open position against the action of the spring 62 so long as it is necessary to operate the car under such abnormal conditions. The switch 9 which also constitutes a circuit controlling switch may be located in an entirely different part of the car and not within the control of the operator. The same is true of the switches [illegible] 28 and 37 which may be disposed at any convenient place upon the car and accessible only to those having proper authority.

The signal lamp 63 is provided in order that the operator may have a visible indication of the position of the doors of the car and thus avoid turning on the power by means of the controller 3, (assuming that the protective control of this controller is not used) in order to determine whether the doors of the car have been closed to release the automatic control of the brakes.

While current for operating the protective system shown in the figure is normally taken from the trolley wire, it is to be noted that the protective devices may be operated when the trolley is off of the trolley wire or when the current fails for any reason or at any other time by moving the switch 64 in the wire 11 to its alternate [illegible] to disconnect the trolley [illegible] protective system and connect [illegible] with the protective devices, [illegible] which is adapted to furnish current [illegible] the protective system.

While [illegible] our invention in the embodiment herein described, we do not [illegible] to the constructions herein disclosed but desire to claim any equivalents [illegible] themselves to those [illegible]

What we claim is:

1. In a passenger car, the combination of a door, braking mechanism, a brake controller, and means for preventing motion of the controller to release the braking mechanism when the door is open.

2. In a passenger car, the combination of a door, braking mechanism, a brake controller, means for preventing motion of the controller to release the braking mechanism when the door is open, and means for setting the braking mechanism by the opening of the door.

3. In a passenger car, the combination of an ingress door, an egress door, braking mechanism, a brake controller, and means for preventing motion of the controller to release the braking mechanism when either door is open.

4. In a passenger car, the combination of an ingress door, an egress door, braking mechanism, a brake controller, means for preventing motion of the controller to release the braking mechanism when either door is open, and means for setting the braking mechanism by the opening of either door.

5. In a passenger car, the combination of a door, braking mechanism, means for setting the braking mechanism by the opening of the door, mechanism manually movable to temporarily disable the brake setting means, and means for holding said mechanism in a position to permit the operation of the brake setting means when not thus actuated.

6. In a passenger car, the combination of a door, braking mechanism, a brake controller, means for preventing motion of the controller to release the braking mechanism when the door is open, means for setting the braking mechanism by the opening of the door, mechanism manually movable to temporarily disable the brake-setting means, and means for holding said mechanism in a position to permit operation of the brake setting means when not thus actuated.

7. In a passenger car, the combination of a door, braking mechanism, means for preventing the release of the braking mechanism when the door is open, mechanism manually movable to temporarily disable the said preventing means, and means for holding said mechanism in a position to permit operation of the preventing means when not thus actuated.

8. In a passenger car, the combination of a door, braking mechanism, a brake controller, means for preventing motion of the controller to release the braking mechanism when the door is open, mechanism manually movable to temporarily disable the said preventing means, and means for holding said mechanism in a position to permit operation of the preventing means when not thus actuated.

In witness whereof, I hereunto subscribe my name as joint inventor this 29th day of June, A. D. 1912.

LOUIS E. FISCHER.

Witnesses:
W. L. MURPHY,
JAMES T. GATES.

In witness whereof, I hereunto subscribe my name as joint inventor this 29th day of June, A. D. 1912.

GEORGE W. BURTON.

Witnesses:
R. J. MCSKIMIN,
CHESTER O. FISCHER.